(No Model.)
C. A. MAUS.
APPARATUS FOR AND PROCESS OF COOLING AND CONDENSING THE FOAM WHICH FORMS ON THE SURFACE OF FERMENTING LIQUOR.
No. 280,385. Patented July 3, 1883.
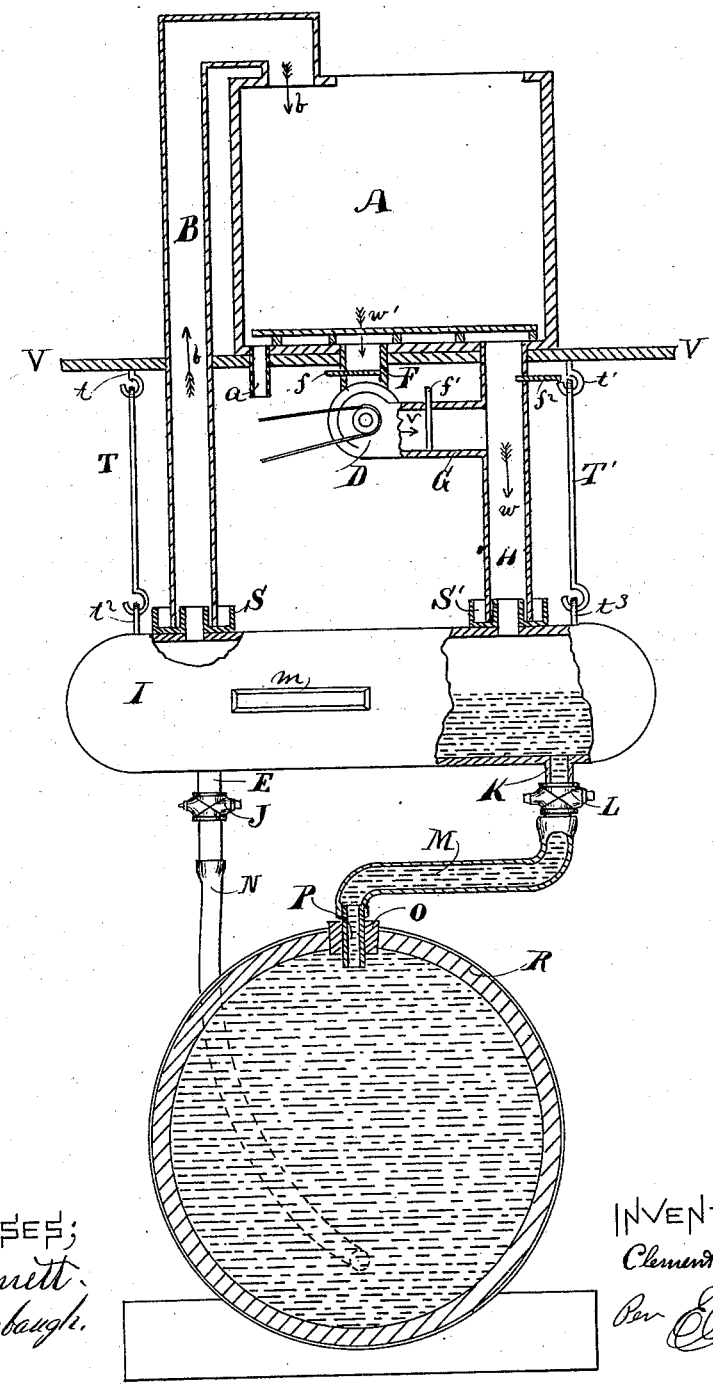
WITNESSES;
G. H. Rennett
H. F. Aughinbaugh.
INVENTOR.
Clement A. Maus
Per E. O. Frink
his Attorney
N. PETERS. Photo-Lithographer, Washington, D. C.

UNITED STATES PATENT OFFICE.

CLEMENT A. MAUS, OF INDIANAPOLIS, INDIANA.

APPARATUS FOR AND PROCESS OF COOLING AND CONDENSING THE FOAM WHICH FORMS ON THE SURFACE OF FERMENTING LIQUOR.

SPECIFICATION forming part of Letters Patent No. 280,385, dated July 3, 1883.

Application filed October 19, 1880. (No model.)

*To all whom it may concern:*

Be it known that I, CLEMENT A. MAUS, a citizen of the United States, residing at Indianapolis, in the county of Marion and State of Indiana, have invented a new and Improved Apparatus for and Process of Cooling and Condensing the Foam which Forms on the Surface of Fermenting Liquor, Wort, Beer, &c., of which the following is a specification.

My invention relates to an apparatus for cooling and condensing the foam of fermenting liquors, wort, beer, ale, &c, in which a condensing-chamber operates in conjunction with suitable pipes, a current of cooled and purified air from an ice-reservoir, and a vessel containing the fermenting liquid; and the objects of my invention are, first, to provide a means for condensing the foam that is forming on the surface of fermenting wort, beer, ale, &c., by blowing on or beating it with a current of cooled air, thus converting the foam into a liquid state again and permitting it to run back into the fermenting body of liquid; second, to provide facilities for counteracting the volatilization of the flavor and fine hop aroma of the wort, beer, ale, &c., while undergoing several stages of fermentation; third, to provide a means for preventing the escape of the volatile portion of the hop aroma and flavor of the fermenting wort, beer, ale, &c., during the first and last stages of the fermenting body. These objects I accomplish by the mechanism illustrated by the accompanying drawing, in which the entire apparatus is illustrated by a single figure, which is partially in section to show the construction and arrangement of certain parts more fully.

A represents an ice-box, ice-holder, or cooling-chamber, which may be of any desired size or form, and either provided with a cover or not, as desired, and having a pipe, B, leading into it at or near its upper side, and a pipe, H, leading from it at or near its bottom. The pipe H may extend into the ice-holder or cooling-chamber, or be coiled around therein, so that the air in said pipe is made cold. These two air-pipes B and H extend downward, and their lower ends are set in water-seals S S', which are secured on the top surface of the condensing-cylinder I. The condensing-cylinder I may be round, oblong, or oval in cross-section. I prefer, however, to have it oval, and it is provided with a glass window, $m$, in one side, for the purpose of allowing the contents to be readily inspected without opening the cylinder. The upper side of the cylinder I is provided with an opening at each end, around which are secured the water-seals S S', for the ends of the air-pipes B and H to rest in and form air-tight joints. Near each end of the cylinder I, at the top, is fastened two eyes, $t^2$ $t^3$, in which the rods T T' are hooked. The upper ends of these rods T T' are also hooked into screw eyes or hooks $t$ $t'$, which are secured to the floor V or other convenient place above the cylinder. Thus the cylinder I is hung loosely under the pipes B and H, and the joints of said pipes with the cylinder made air-tight by the water-seals S S'. The lower side of the cylinder I is provided with a pipe, K, and may be provided with an additional pipe, E, if desired. The pipe K is provided with a cock, L, and a flexible pipe, M, connecting with the pipe P in the bung O of the cask R. If the pipe E is employed, it also is provided with a cock, J, and a flexible pipe, N, which leads into the cask R at one end, as shown. The lower portion of the ice-holder A is provided with a pipe, F, leading directly to a fan, D, with a valve, $f$, above, to close or open the pipe F when desired. The discharge end of the fan D connects by a pipe, G, with the pipe H, and the pipes G and H are provided with their respective valves $f'$ and $f^2$, for opening and closing the pipes, as will be hereinafter described.

Having thus described the construction and arrangement of my improved apparatus, I will now describe its mode of operation as follows, to wit: The unfermented liquor, wort, beer, &c., is placed in the cask or vessel R, and as it begins to ferment it, together with the foam, rises through the pipe M into the condensing-cylinder I. In case the fan is not used the valves $f f'$ are closed in the pipes F and G, and the valves $f^2$ in the pipe H is opened. The cold air from the ice-holder A above circulates down through the pipe H into the condensing-chamber I on top of the foam of the fermenting liquor, and passes through the chamber I, where its temperature is increased. The warm air then circulates up through the pipe B, and is conducted into the ice-holder A at or near its top, as shown. In case the fan D is used to create a more rapid circulation, then the valve $f^2$ in the pipe H is closed, and the valves $f f'$ in the pipes F and G open, the air always circulating in the pipes H and B in the direction of the arrows $w\ b\ b$. As the cooled and purified air comes in contact with the foam that is forming on the surface of the fermenting liquor in the cylinder I the foam is condensed into a liquid state, and runs back again through the pipe M or pipes M and N into the fermenting body of liquor in the cask or vessel R, thus preventing the volatilization and escape of the flavor and fine hop aroma of the wort, beer, ale, &c., while undergoing the several stages of fermentation.

What I claim as my invention, and desire to secure by Letters Patent, is—

1. In an apparatus for cooling and condensing the foam which forms on the surface of fermenting liquor, wort, beer, ale, &c., the condensing-cylinder I, combined with the ice-holder or cooler A, the air-circulating pipes B and H, the connection M with valve L, and the cask or vessel R, all arranged and adapted to operate, substantially as shown and described.

2. The condensing-cylinder I, with glass window $m$, water-seals S S', and hooks or eyes $t^2\ t^3$, combined with the air-circulating pipes B and H, the rods T T', and hooks or eyes $t\ t'$, whereby the cylinder is suspended below the ends of the air-pipes, and air-tight joints formed between said cylinder and air-pipes, substantially as shown and described.

3. In combination, with the cylinder I, which is suspended under the pipes B and H, the pipes B and H, the ice-holder or cooler A, the fan D, and the pipes F and G, all arranged to operate substantially as shown and described.

4. The herein-described process of condensing the foam of fermenting liquors, which consists in conducting the gas and foam generated in the fermentation-vat into an air-tight vessel, then withdrawing the gas and air from such vessel, cooling the same, and forcing it back in a current upon the foam, substantially as described.

5. The herein-described process of condensing the foam of fermenting liquids and retaining all the flavor and aroma contained therein, which consists in conducting the gas and foam generated in the fermentation-vat into an air-tight vessel, then withdrawing the gas and air from such vessel, cooling the same, forcing it back in a current upon the foam, and finally returning the condensed portion to the body of the liquid in the fermenting-vat, substantially as and for the purpose described.

6. The combination of the ice-holder or air-cooler A, the pipes B, H, F, and G, with their valves $f f'\ f^2$, and fan D, substantially as shown and described.

7. In an apparatus for condensing the foam arising during fermentation of liquor in one or more closed vessels, a condensing-cylinder, $f$, connected with the fermenting-cask by suitable pipes and cocks, and suspended or sustained above such cask, for receiving the foam arising during fermentation, and below a cooling-chamber, with means for passing a current of cooled air through such condenser and returning the air when heated to the cooling-chamber, substantially as and for the purpose described.

In testimony whereof I have signed my name to this specification in the presence of two subscribing witnesses.

CLEMENT A. MAUS.

Witnesses:
E. O. FRINK,
G. H. RENNETT.